United States Patent
Allen et al.

(10) Patent No.: US 11,444,853 B2
(45) Date of Patent: Sep. 13, 2022

(54) PREDICTING THE EFFICACY OF ISSUES DETECTED WITH MACHINE EXECUTED DIGITIZED INTELLECTUAL CAPITAL

(71) Applicant: Cisco Technology, Inc., San Jose, CA (US)

(72) Inventors: Donald Mark Allen, Colorado Springs, CO (US); Dmitri Goloubev, Waterloo (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/153,252

(22) Filed: Jan. 20, 2021

(65) Prior Publication Data
US 2022/0231928 A1   Jul. 21, 2022

(51) Int. Cl.
*H04L 41/50* (2022.01)
*H04L 41/082* (2022.01)
*G06F 11/34* (2006.01)
*H04L 41/16* (2022.01)

(52) U.S. Cl.
CPC ...... *H04L 41/5096* (2013.01); *G06F 11/3428* (2013.01); *G06F 11/3457* (2013.01); *H04L 41/082* (2013.01); *H04L 41/16* (2013.01)

(58) Field of Classification Search
CPC .................................................. H04L 41/5096
See application file for complete search history.

(56) References Cited

U.S. PATENT DOCUMENTS

| | | | |
|---|---|---|---|
| 2003/0083898 A1 | 5/2003 | Wick et al. | |
| 2004/0230691 A1 | 11/2004 | Wookey | |
| 2018/0316545 A1 | 11/2018 | White, Jr. et al. | |
| 2020/0213203 A1* | 7/2020 | Mortensen | H04L 41/147 |
| 2021/0064507 A1* | 3/2021 | Chakra | G06F 11/3447 |

OTHER PUBLICATIONS

Dee Alwis, "The Role of Intellectual Capital in Organisational Value Creation: An Application of a Theoretical Model of Two Case Studies", Department of Information Systems and Computing Brunel University, May 2004, 291 pages.
Donald M. Allen et al., "Customer Self-remediation of Proactive Network Issue Detection and Notification", International Conference on Human-Computer Interaction, LNCS 12217, Jul. 2020, 14 pages.
Barry Boehm et al., "Software Economics: A Roadmap", Proceedings of the conference on The future of Software engineering, May 2000, 25 pages.

* cited by examiner

*Primary Examiner* — Adnan M Mirza
(74) *Attorney, Agent, or Firm* — Edell, Shapiro & Finnan, LLC

(57) ABSTRACT

A digitized Intellectual Capital (IC) system obtains code modules configured to detect one or more issues in a computing system. The IC system selects from the code modules to generate a first set of code modules based on a corresponding value metric. The corresponding value metric for each code module in the first set of code modules is higher than a predetermined threshold. The IC system also samples from the remainder of the code modules unselected for the first set of code modules to generate a second set of code modules. The IC system runs the first set of code modules and the second set of code modules to detect the one or more issues and updates the corresponding value metric for at least one code module.

20 Claims, 5 Drawing Sheets

PREDICTING THE EFFICACY OF ISSUES DETECTED WITH MACHINE EXECUTED DIGITIZED INTELLECTUAL CAPITAL

TECHNICAL FIELD

The present disclosure relates to management of intellectual capital, especially with code modules representing the intellectual capital.

BACKGROUND

Intellectual Capital (IC) can be captured and digitized in the form of code modules written to detect issues in a computing system. The IC code modules are typically written to detect a particular issue in a particular environment. The issue in the computing device may be related to error conditions, potential error conditions, and/or best practices in configuration. Typically, an IC engine runs multiple IC code modules against a computing system to search for multiple issues at a time. New IC code modules are typically added to detect new types of issues, or to detect issues in new types of computing systems.

DESCRIPTION OF EXAMPLE EMBODIMENTS

Overview

Figure 1:
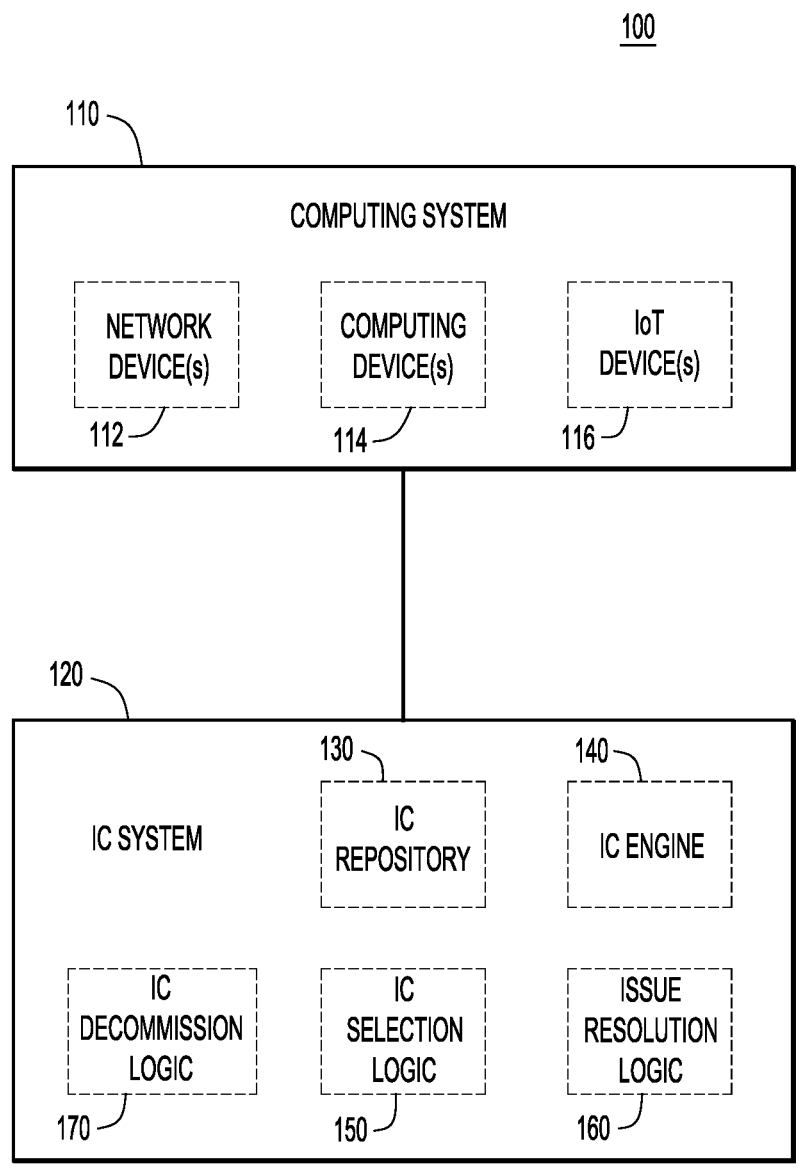
FIG. 1 is a simplified block diagram of an IC system for detecting issues in a computing system, according to an example embodiment.

A computer implemented method is provided for managing digitized IC. The method includes obtaining a plurality of code modules configured to detect one or more issues in a computing system. The method also includes selecting from the plurality of code modules to generate a first set of code modules based on a corresponding value metric. The corresponding value metric for each code module in the first set of code modules is higher than a predetermined threshold. The method further includes sampling from a remainder of the plurality of code modules unselected for the first set of code modules to generate a second set of code modules. The method includes running the first set of code modules and the second set of code modules to detect the one or more issues and updating the corresponding value metric for at least one code module in the plurality of code modules.

Example Embodiments

Digitized Intellectual Capital (IC), or machine executable issue detection, extends the reach of human knowledge more broadly in a network environment by enabling the automated identification of present and potential problems that could impact the availability of network services. Converting human knowledge or even machine generated knowledge, such as anomaly detection, is context-specific and context changes as a function of product life cycle and changes in the network. Left unchecked the amount of available IC will continue to grow, requiring more time and greater resources to execute. The techniques presented herein provide a method and system for determining the relative value of available IC, enabling an operator to predict whether the return on investment justifies retaining an IC module as part of the working set of IC. This approach combines a number of factors having to do with the IC execution as well as customer consumption of the results to identify IC that should be decommissioned and no longer executed.

The creation and execution of human-created, machine-consumable IC code modules is associated with various business costs. Typical IC code module creation involves a user having to identify issues that may be candidates for machine detection. Once identified, the issue may be triaged by a user who determines whether the issue can be detected with the available output, as well as determining a form (e.g., on a device, controller, or in the cloud) for capturing and executing a signature of the issue. The code module for the detection and remediation logic may then be written, classified, tested, published and deployed. Once, deployed, the code module may be executed periodically (e.g., proactively) or on demand (e.g., in support of specific tasks). Typically, a code module is executed to determine whether it is applicable for a particular context (e.g., device, operating system version, role in the network, etc.) for at least some part of the signature detection (e.g., accessing the signature or executing precondition logic). If the code module passes the preconditions to be applicable to the particular context, the detection logic in the code module may be executed, triggering additional data collection from the computing system.

As new devices and elements are added to a system, and the configuration of existing devices and elements are updated (e.g., with new operating systems) or phased out, new IC code modules may be created to detect issues. Additionally, existing IC code modules may be updated to adapt to changes in the computing system, adding additional business costs to the overall investment in the digitization of the IC system.

Creating and maintaining tens of thousands of IC code modules, as well as executing those code modules on potentially millions of devices requires significant human investment, tooling investment, and computing resources. If the IC repositories continue to grow as the development of computing systems continues, resources may be spent on creating/maintaining code modules that no longer provide any value to the customer. The techniques presented herein provide a system for automatically identifying code modules that should no longer be included in the deployed set of code modules, eliminating additional business costs of making the decision to retire or further maintain specific code modules. Additionally, the techniques presented herein may provide a prediction of when a particular IC code module may lose business value, enabling the scheduled removal of IC code modules.

Referring now to FIG. 1, a system 100 is shown for detecting issues in a computing system 110. The computing system 110 may include one or more network devices 112, one or more computing devices 114, and/or one or more Internet of Things (IoT) devices 116. In one example, the network devices 112 may include switches, routers, gateways, or other network elements configured to transfer data.

In another example, the computing devices 114 may include servers, personal computers, virtual machines, or other computing devices configured to process data. In a further example, the IoT devices 116 may include appliances, sensors, or other embedded devices.

The computing system 110 is connected to an IC system 120 that is configured to detect issues in the computing system 110 using IC code modules. The individual code modules are stored in an IC repository 130. In one example, the IC repository 130 may be one or more memory devices configured to store electronic data, such as the code modules, and may include multiple devices for redundancy, reliability, speed, and/or bandwidth. The code modules in the IC system 120 are run on an IC engine 140. In one example, the IC engine may be one or more processors configured to obtain data from the computing system 110 and run one or more code modules from the IC repository 130.

The IC system 120 also includes an IC selection logic 150 that enables the IC system 120 to select code modules from the IC repository 130 to run on the IC engine 140. In one example, the IC selection logic 150 selects code modules that are applicable and most likely to provide value in detecting issues in the computing system 110. The IC system 120 includes an issue resolution logic 160 that enables the IC system 120 to detect whether the issues detected by the code modules are resolved in the computing system 110. The IC system 120 further includes IC decommissioning logic 170 that enables the IC system 120 to remove IC code modules that no longer provide value in finding issues in the computing system 110.

As the number of code modules in the IC repository 130 grows, and the number and configuration of the devices in the computing system 110 changes, the data and resources needed to execute all of the code modules grows. The IC system 120 provides a means for properly managing and culling the code modules based on whether the code modules continue to provide value to the customer (e.g., the operator of the computing system 110). The IC system 120 identifies metrics and metadata to determine present customer value, and predicts when specific code modules may no longer be valuable. In one example, the relevant metrics for value may include the number of executions of a code module, the number of detections by a code module, the number of times the issue detected by a code module was ignored by the customer, and/or the number of times the issue was resolved in the computing system 110. In another example, the metadata for customer value may include IC classification, product specificity and life cycle, customer preferences, and/or the role of the devices.

Figure 2:
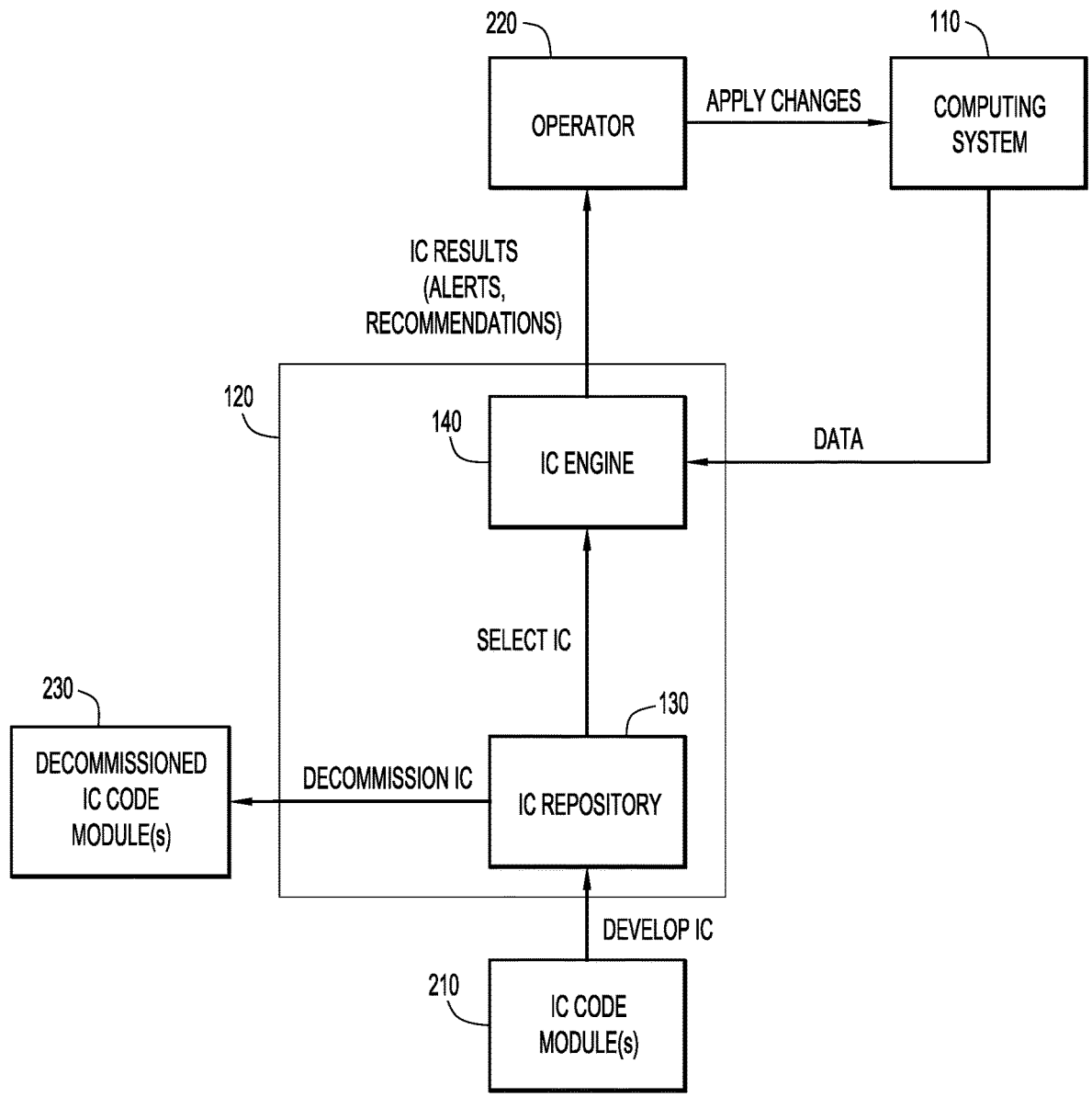
FIG. 2 illustrates the life cycle of an IC code module, according to an example embodiment.

Referring now to FIG. 2, an example of the life cycle of IC code module(s) 210 is shown to highlight the value to the customer. The IC code modules 210 are developed and stored in the IC repository 130. The creation and maintenance of the IC code modules 210 constitute resource expenditure to increase the coverage of the code modules or to prevent the decrease of coverage of the code modules. The IC system 120 collects data from the computing system 110 and uses the IC engine 140 to apply selected code modules from the IC repository 130 to the data from the computing system 110 to detect issues in the computing system 110. Running the IC engine 140 (e.g., collecting data, selecting code modules, running code modules) constitutes additional resource expenditure (e.g., to obtain cloud-provided storage and processing power). Running the IC engine 140 also produces IC results, such as issue detection, alerts, and recommendations for remediation.

The IC system 120 may choose some or all of the IC results to send to the operator 220 of the computing system 110 or an automated system run by the operator 220 of the computing system 110. In one example, the automated system run by the operator 220 may include a network management system with logic to react and respond to issues detected in a computer network (e.g., computing system 110) by the IC system 120. Receiving and parsing the IC results may impose a cognitive load on human operators or resource expenditure on of automated systems. The operator 220 may apply changes to the computing system 110 based on the recommendations in the IC results, which results in future changes in the data provided to the IC engine 140 in future runs of selected code modules from the IC repository 130. Additionally, the IC system 120 may use the data obtained from the computing system, or obtained directly from the operator 220, to select IC code modules 230 to decommission and remove from the IC repository 130.

The value of the IC system 120 may be viewed as a difference between the expenditure in running the IC system 120 (e.g., maintenance of code modules, running code modules, cognitive load in parsing results, etc.) and the improvements to the computing system (e.g., in availability, time-to-resolution, etc.). This value may be quantified by comparing Key Performance Indicators (KPIs) before and after the IC system 120 is deployed on the computing system 110 or comparable systems.

In one example, a number of factors may be applied to determine a value metric to balance with the resource expenditure of running a code module on the IC system 120. The value metric of a code module may be based on the applicability of the code module (e.g., whether the software/hardware configurations required by the code module are present in the computing system 110), running the code module (e.g., the number of times a code module is run by the IC engine 140), detecting issues (e.g., the number of times the code module detects an issue), impressions to the operator (e.g., the number of times the code module generates a result that is presented to the operator 220), and remediating issues (e.g., the number of times a subsequent run of the code module detects the issue is no longer present in the computing system 110).

Detections that correlate strongly with rapid changes and clearing of an underlying issue may be a good indicator of utility and value. Code modules with high detection KPIs are typically prioritized over code modules that are not applicable to the computing system 110, or that find few issues in the computing system 110, or that find issues that are rarely/never fixed by the operator 220. However, some issues with the computing system 110 may not be adequately captured by code modules that are prioritized by repeatedly detecting and clearing issues.

In one example, the computing system 110 may have an intermittent issue that appears and disappears without operator involvement. Code modules that detect this type of issue may be prioritized by metrics such as prediction error of the time to fix, recurrence, age/detection rate, and/or internetwork entropy. Other code modules may detect extremely rare issues, but the impact of the issue justifies the continued presence of these code modules in the IC repository. The IC system 120 may use specific metadata to prioritize these high-impact code modules above the value metric that would be assigned solely based on the statistical value estimation.

Figure 3:
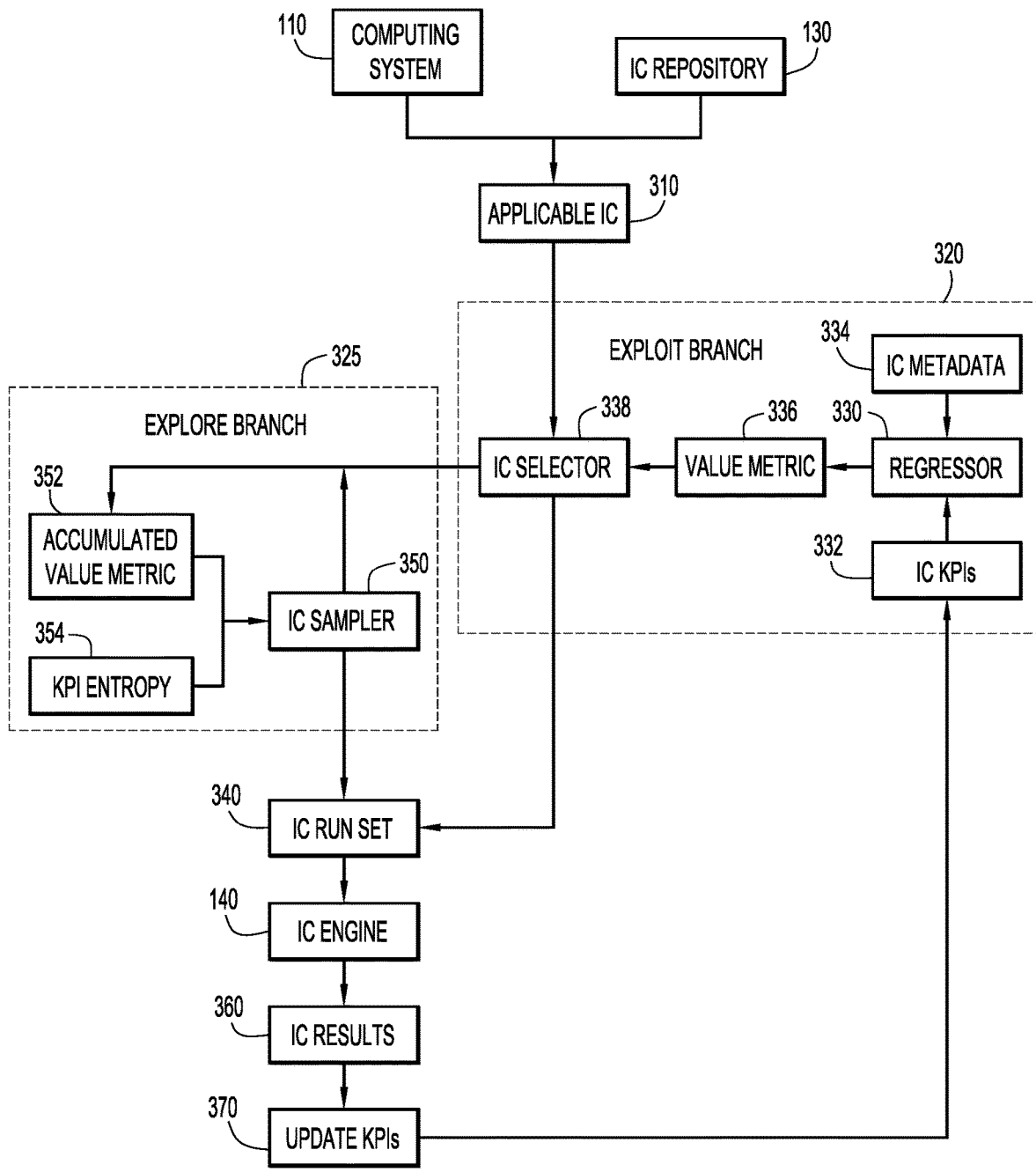
FIG. 3 illustrates the application of IC code modules to a computing system, according to an example embodiment.

Referring now to FIG. 3, a flowchart illustrates an example of the IC system selecting IC code modules and providing feedback on the value of individual code modules.

The IC system compares the code modules in the IC repository 130 with the configuration of the computing system 110 to obtain a set of IC code modules 310 that are applicable to the computing system. For instance, the IC system may inspect the current state of the computing system 110 (e.g., device hardware and software) and provide code modules that are designed to detect issues in particular devices and/or software versions that are present in the computing system 110 to generate the set of applicable code modules 310.

The set of applicable code modules 310 is provided to an exploit branch 320 and an explore branch 325 to select a set of code modules that provide the most value to the operator of the computing system 110. In the exploit branch 320, a regressor 330 collects IC KPIs 332 (e.g., applicability scope, a history of runs, a history of detections, a history of impressions, a history of remediations, etc.), as well as IC metadata 334 (e.g., the age or specific priority category of the code module) to generate a value metric 336 for each code module. In one example, the value metric may be a quantified as a probability that an issue will be found by the associated code module and remediated by the operator of the computing system 110. In another example, the value metric may be represented by a vector presenting each uncertainty separately as either a probability (e.g., 60% chance to find an issue that has been fixed 75% of the time in the past) or as a count (e.g., the code module will find N issues, and M issues will be fixed).

A selector 338 in the exploit branch 320 selects the code modules most likely to detect issues and provide value to the operator of the computing system. In one example, the selector 338 may select all of the code modules with a value metric above a predetermined threshold. Alternatively, the selector 338 may select the code modules associated with the top percentage (e.g., the top 60%) of the value metrics. The exploit branch 320 is configured to select code modules based on the likelihood that the code module will detect an issue that will be remediated by the operator of the computing system 110 and add the selected code modules to the run set of IC code modules 340. In another example, the exploit branch 320 may be configured to include a selection of code modules that detect issues that provide a significant impact on a particular computing system of a particular operator, even when the measured IC KPIs 332 are relatively low.

The explore branch 325 adds to the run set of IC code modules 340 by using a sampler 350 to sample applicable code modules that have not been selected by the selector 338 based on an accumulated value metric 352 and KPI entropy 354. The sampler 350 is partly stochastic in sampling from the remaining code modules, but the odds of selection may not be equal for each code module. The explore branch maintains the accumulated value metric 352 for any code module that was not selected by the selector 338 or the sampler 350. The accumulated value metric 352 boosts the odds of being sampled by the sampler 350 in future run sets.

The IC engine 140 runs the run set of IC code modules 340 to generate IC results 360. Based on the IC results 360, the IC system may provide the exploit branch 320 with a KPI update 370 for the code modules that were included in the run set of IC code modules 340, including the code modules added by the explore branch 325.

Depending on the IC code modules and the computing system 110, the value metric 336 calculated by the regressor 330 may include a variable amount of uncertainty. The explore branch 325 is configured to sample code modules that have not been selected by the exploit branch 320, but which may still provide value to the operator of the computing system 110. Additionally, the explore branch 325 may provide training data for the regressor 330 to better evaluate code modules to determine an accurate value metric 336.

In one example, the regressor 330 may be based on a machine learning model that is iteratively trained by the IC results 360 and the KPI update 370. Including training data from the explore branch 325 enables the IC system to train the regressor 330 in a self-supervised manner, and makes the process economical without expert data curation. However, expert data curation may provide faster convergence for a machine learning regressor 330. A machine learning regressor 330 may be based on a Generalized Additive Model (GAM) or a Generalized Linear Model (GLM) for situations in which transparency is important. Alternatively, neural network models (e.g., Deep Neural Network, Recursive Neural Network) may be used for the regressor 330 for situations in which additional predictive power and model capacity provide a benefit.

The goal of the explore branch 325 may be two-fold. Initially, the regressor 330 may not be adequately trained to accurately predict which code modules will have a high value metric 336, and the sampler 350 may provide the majority of the run set of IC code modules 340. As the code modules are run multiple times, the KPI updates 370 may provide sufficient training for the regressor 330 to enable the selector 338 to populate a more significant portion of the run set of IC code modules 340.

Additionally, the explore branch 325 may compensate for prediction errors in the exploit branch 320. In other words, the selector 338 may not select a particular code module that would resolve an uncommon issue in the computing system 110. The explore branch 325 provides a chance/possibility that the particular code module will be picked stochastically, which would allow the KPI update 370 to retrain the regressor 330. Retraining of the regressor 330 provides for a more accurate value metric 336, which enables the selector 338 to provide a more accurate prediction of code modules that are likely to provide value in finding issues in the computing system 110. Code modules configured to detect issues that are truly random will almost certainly be added to the run set of IC code modules 340 through the explore branch 325, since the value metric of a code module for a random event is likely to remain relatively low.

Operating the IC system described herein over time on a number of networks may produce data that is useful to automatically decommission legacy code modules that no longer provide value to the operator of the computing system 110. In one example, the IC system may automatically decommission legacy code modules with a value metric that is uniformly declining over time. The threshold for decommissioning a code module may be driven by the bandwidth provided to the explore branch 325. If the IC system does not provide computing power to allow the explore branch to inject enough code modules to provide training data for the exploit branch 320, then the IC system either needs to allocate additional computing power to the IC engine 140 (i.e., enlarge the run set of IC code modules 340 and run more code modules from the explore branch) or the corpus of IC code modules needs to be reduced.

In another example, multiple IC code modules may be treated as related to conserve processing resources. Given the finite amount of resources usable in IC code module execution, each IC code module may be graded (e.g., in the exploit branch 320) with a binary classifier (i.e., above or below a predetermined threshold) based on the metadata and KPI statistics for the IC code module. Grouping similar IC code modules enables the IC system 120 to apply the binary classification of a single IC code module to a suite of related IC code modules, rather than individually classify each IC code module in the suite. For instance, one IC code module may be configured to detect a particular network issue for one version of an operating system on a router. Related IC code modules may include IC code modules configured to detect the same network issue on the same router that is running a newer version of the operating system. Alternatively, related IC code modules may be grouped based on the similarity of the issues that each IC code module is configured to detect.

Applying the same classification to multiple IC code modules enables the IC system 120 to operate without constant data curation and tagging for new IC code module, because each new IC code module may be related to an existing IC code module that has already been classified. In one example, to address the cold start problem, the regressor 330 may be trained on a small number of expert-curated examples in which the entire IC corpus stored in the IC repository 130 is executed, and split into related groups to be annotated by a subject matter expert.

In a further example, with an IC engine 140 that is instrumented to provide near-real-time data, another machine learning approach may be to use a reinforcement learning model to directly maximize the value metric. The reinforcement learning model may use resource expenditure as a negative outcome and KPI statistics as a positive outcome. The reinforcement learning action space may be directed to making decisions to maintain and run each IC code module. The reinforcement learning state space may include the statistics of code modules, metadata of the code modules, as well as a window of detections by IC code modules over time.

Figure 4:
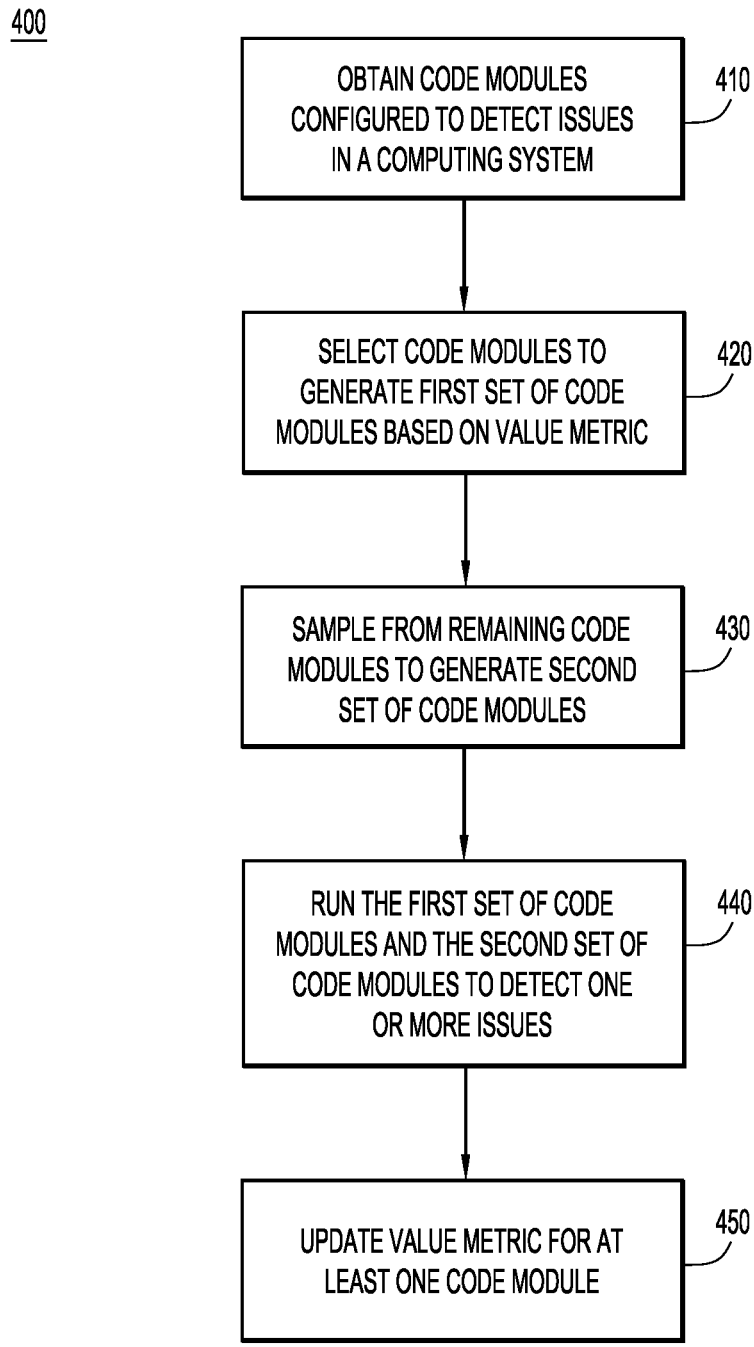
FIG. 4 is a flowchart illustrating operations performed at an IC system processor to detect issues in a computing system and update the value of IC code modules, according to an example embodiment.

Referring now to FIG. 4, a flowchart illustrates operations performed by an IC system (e.g., IC system 120) in a process 400 for managing code modules to detect issues in a computing system. At 410, the IC system obtains a plurality of code modules that are configured to detect one or more issues in a computing system. In one example, the code modules may be machine consumable code modules that detect issues in a computing system and provide remediation recommendations to the operator of the computing system.

At 420, the IC system selects code modules from the plurality of code modules based on a corresponding value metric for each code module. The selected code modules generate a first set of code modules that will be run by the IC system. In one example, the value metric may be based on statistical KPI data and/or metadata associated with each code module. The IC system may select code modules for the first set of code modules based on the corresponding value metric exceeding a predetermined threshold.

At 430, the IC system samples from the remaining code modules that have not been selected for the first set of code modules and generates a second set of code modules. In one example, the second set of code modules may be sampled by way of a stochastic process based on an accumulation metric that boosts the probability of a code module being included in the second set of code modules. The accumulation metric may be based on the value metric associated with the code module and the number of times the code module has not been selected to be run by the IC system.

At 440, the IC system runs the first set of code modules and the second set of code modules to detect one or more issues in the computing system. In one example, running the first set of code modules and the second set of code modules provides feedback that one or more issues are present in the computing system, as well as potential remediation steps for resolving the issues. Based on the results of running the first set of code modules and the second set of code modules, the IC system updates the value metric for at least one code module at 450. In one example, the IC system may increase the value metric for a code module that detected an issue and presented the issue to an operator of the computing system. The IC system may further increase the value metric of a particular code module based on a detection that the computing system has resolved an issue previously detected by that particular code module.

Figure 5:
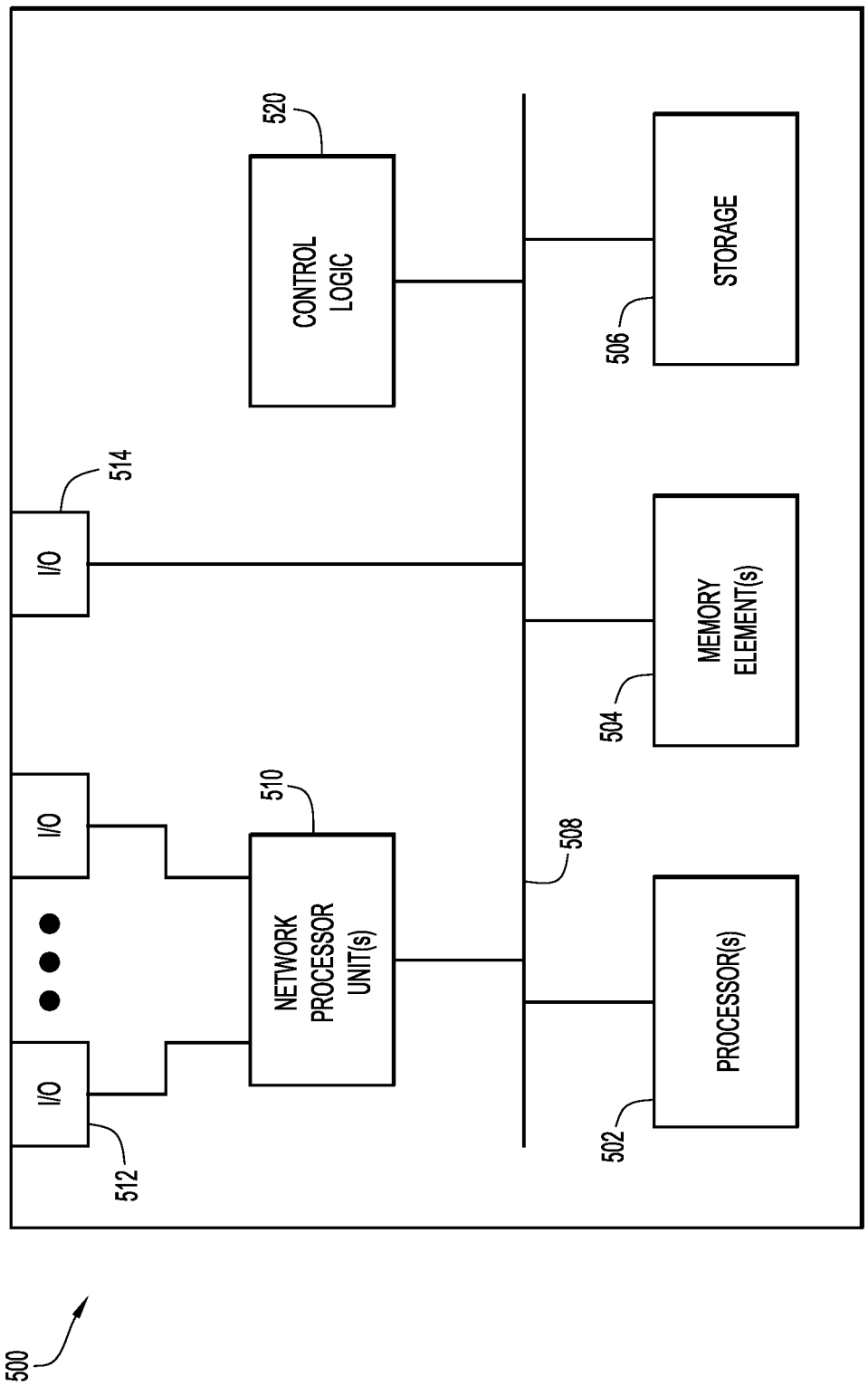
FIG. 5 illustrates a simplified block diagram of a device that may be configured to perform the methods presented herein, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein manage digitized IC to proactively identify potential issues that could impact the performance of a computing system as well as to assist in troubleshooting/remediation of issues with the computing system. The techniques presented herein mitigate human costs and resource expenditures associated with updating and executing the IC code modules by aging out IC code modules that may no longer be applicable or provide business value. The techniques enable the IC system to predict when IC code modules will no longer provide value, enabling businesses to proactively plan and remove the ongoing maintenance costs of these IC code modules.

In one form, a method is provided for managing digitized IC. The method includes obtaining a plurality of code modules configured to detect one or more issues in a computing system. The method also includes selecting from the plurality of code modules to generate a first set of code modules based on a corresponding value metric. The corresponding value metric for each code module in the first set of code modules is higher than a predetermined threshold.

The method further includes sampling from a remainder of the plurality of code modules unselected for the first set of code modules to generate a second set of code modules. The method includes running the first set of code modules and the second set of code modules to detect the one or more issues and updating the corresponding value metric for at least one code module in the plurality of code modules.

In another form, an apparatus comprising a network interface and a processor is provided. The network interface is configured to communicate with a plurality of computing devices. The processor is coupled to the network interface, and configured to obtain a plurality of code modules configured to detect one or more issues in a computing system. The processor is also configured to select from the plurality of code modules to generate a first set of code modules based on a corresponding value metric. The corresponding value metric for each code module in the first set of code modules is higher than a predetermined threshold. The processor is further configured to sample from a remainder of the plurality of code modules unselected for the first set of code modules to generate a second set of code modules. The processor is configured to run the first set of code modules and the second set of code modules to detect the one or more issues. The processor is also configured to update the corresponding value metric for at least one mode module in the plurality of code modules.

In still another form, a non-transitory computer readable storage media is provided that is encoded with instructions that, when executed by a processor, cause the processor to obtain a plurality of code modules configured to detect one or more issues in a computing system. The instructions cause the processor to select from the plurality of code modules to generate a first set of code modules based on a corresponding value metric. The corresponding value metric for each code module in the first set of code modules is higher than a predetermined threshold. The instructions also cause the processor to sample from a remainder of the plurality of code modules unselected for the first set of code modules to generate a second set of code modules. The instructions further cause the processor to run the first set of code modules and the second set of code modules to detect the one or more issues. The instructions also cause the processor to update the corresponding value metric for at least one ode module in the plurality of code modules.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a plurality of code modules configured to detect one or more issues in a computing system, wherein each code module of the plurality of code modules is configured to detect a corresponding issue of the one or more issues;
   selecting from the plurality of code modules to generate a first set of code modules based on a corresponding value metric that includes a first probability of detecting the one or more issues in the computing system and a second probability that the one or more issues will be resolved after being detected, the corresponding value metric for each code module in the first set of code modules being higher than a predetermined threshold;
   sampling from a remainder of the plurality of code modules unselected for the first set of code modules to generate a second set of code modules that contains fewer code modules than the remainder of the plurality of code modules unselected for the first set of code modules;
   running the first set of code modules and the second set of code modules to detect the one or more issues; and
   updating the corresponding value metric for at least one code module in the plurality of code modules.

2. The method of claim 1, wherein the corresponding value metric of a particular code module is based on one or more of: a history of the particular code module being run, a history of the particular code module detecting the one or more issues, a history of the one or more issues being corrected after the particular code module detected the one or more issues, or an impact of the one or more issues the particular code module is configured to detect.

3. The method of claim 1, further comprising removing at least one legacy code module from the plurality of code modules based on the corresponding value metric for the at least one legacy code module falling below another predetermined threshold.

4. The method of claim 1, wherein updating the corresponding value metric comprises increasing the corresponding value metric by an accumulation metric for each code module of the plurality of code modules that was not run in the first set of code modules or the second set of code modules.

5. The method of claim 4, wherein sampling from the remainder of the plurality of code modules unselected for the first set of code modules comprises selecting at least one unused code module for inclusion in the second set of code modules based on the accumulation metric corresponding to the at least one unused code module.

6. The method of claim 1, further comprising providing a message to an operator of the computing system, the message indicating at least one detected issue that was detected from running the first set of code modules and the second set of code modules.

7. The method of claim 6, further comprising:
   determining whether at least one detected issue was resolved in the computing system; and
   responsive to a determination that the at least one detected issue is unresolved in the computing system, lowering the corresponding value metric of a particular code module that is configured to detect the at least one detected issue.

8. An apparatus comprising:
   a network interface configured to communicate with a plurality of computing devices; and
   a processor coupled to the network interface, the processor configured to:
      obtain a plurality of code modules configured to detect one or more issues in a computing system, wherein each code module of the plurality of code modules is configured to detect a corresponding issue of the one or more issues;
      select from the plurality of code modules to generate a first set of code modules based on a corresponding value metric that includes a first probability of detecting the one or more issues in the computing system and a second probability that the one or more issues will be resolved after being detected, the corresponding value metric for each code module in the first set of code modules being higher than a predetermined threshold;

sample from a remainder of the plurality of code modules unselected for the first set of code modules to generate a second set of code modules that contains fewer code modules than the remainder of the plurality of code modules unselected for the first set of code modules;

run the first set of code modules and the second set of code modules to detect the one or more issues; and update the corresponding value metric for at least one code module in the plurality of code modules.

9. The apparatus of claim 8, wherein the processor is further configured to remove at least one legacy code module from the plurality of code modules based on the corresponding value metric for the at least one legacy code module falling below another predetermined threshold.

10. The apparatus of claim 8, wherein the processor is configured to update the corresponding value metric by increasing the corresponding value metric by an accumulation metric for each code module of the plurality of code modules that was not run in the first set of code modules or the second set of code modules.

11. The apparatus of claim 10, wherein the processor is configured to sample from the remainder of the plurality of code modules unselected for the first set of code modules by selecting at least one unused code module for inclusion in the second set of code modules based on the accumulation metric corresponding to the at least one unused code module.

12. The apparatus of claim 8, wherein the processor is further configured to cause the network interface to provide a message to an operator of the computing system, the message indicating at least one detected issue that was detected from running the first set of code modules and the second set of code modules.

13. The apparatus of claim 12, wherein the processor is further configured to:

determine whether the at least one detected issue was resolved in the computing system; and responsive to a determination that the at least one detected issue is unresolved in the computing system, lower the corresponding value metric of a particular code module that is configured to detect the at least one detected issue.

14. One or more non-transitory computer readable storage media encoded with software comprising computer executable instructions and, when the software is executed, it is operable to cause a processor to:

obtain a plurality of code modules configured to detect one or more issues in a computing system, wherein each code module of the plurality of code modules is configured to detect a corresponding issue of the one or more issues;

select from the plurality of code modules to generate a first set of code modules based on a corresponding value metric that includes a first probability of detecting the one or more issues in the computing system and a second probability that the one or more issues will be resolved after being detected, the corresponding value metric for each code module in the first set of code modules being higher than a predetermined threshold;

sample from a remainder of the plurality of code modules unselected for the first set of code modules to generate a second set of code modules that contains fewer code modules than the remainder of the plurality of code modules unselected for the first set of code modules;

run the first set of code modules and the second set of code modules to detect the one or more issues; and update the corresponding value metric for at least one code module in the plurality of code modules.

15. The one or more non-transitory computer readable storage media of claim 14, wherein the corresponding value metric of a particular code module is based on one or more of a history of the particular code module being run, a history of the particular code module detecting the one or more issues, a history of the one or more issues being corrected after the particular code module detected the one or more issues, or an impact of the one or more issues the particular code module is configured to detect.

16. The one or more non-transitory computer readable storage media of claim 14, wherein the software is further operable to cause the processor to remove at least one legacy code module from the plurality of code modules based on the corresponding value metric for the at least one legacy code module falling below another predetermined threshold.

17. The one or more non-transitory computer readable storage media of claim 14, wherein the software is further operable to cause the processor to update the corresponding value metric by increasing the corresponding value metric by an accumulation metric for each code module of the plurality of code modules that was not run in the first set of code modules or the second set of code modules.

18. The one or more non-transitory computer readable storage media of claim 17, wherein the software is further operable to cause the processor to sample from the remainder of the plurality of code modules unselected for the first set of code modules by selecting at least one unused code module for inclusion in the second set of code modules based on the accumulation metric corresponding to the at least one unused code module.

19. The one or more non-transitory computer readable storage media of claim 14, wherein the software is further operable to cause the processor to provide a message to an operator of the computing system, the message indicating at least one detected issue that was detected from running the first set of code modules and the second set of code modules.

20. The one or more non-transitory computer readable storage media of claim 19, wherein the software is further operable to cause the processor to:

determine whether the at least one detected issue was resolved in the computing system; and responsive to a determination that at least one detected issue is unresolved in the computing system, lower the corresponding value metric of a particular code module that is configured to detect the at least one detected issue.

* * * * *